US006967944B2

(12) United States Patent
Choi (10) Patent No.: US 6,967,944 B2
(45) Date of Patent: Nov. 22, 2005

(54) INCREASING LINK CAPACITY VIA CONCURRENT TRANSMISSIONS IN CENTRALIZED WIRELESS LANS

(75) Inventor: Sunghyun Choi, Montvale, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 981 days.

(21) Appl. No.: 09/822,457

(22) Filed: Mar. 30, 2001

(65) Prior Publication Data

US 2002/0141375 A1 Oct. 3, 2002

(51) Int. Cl.[7] .............................................. H04B 7/212
(52) U.S. Cl. ...................................... 370/348; 370/347
(58) Field of Search ......................... 370/310, 345–350, 370/328–329, 336–337, 351, 389, 400, 431, 370/442

(56) References Cited

U.S. PATENT DOCUMENTS

| 5,404,571 A | 4/1995 | Makowski ................. 455/33.1 |
| 6,262,980 B1 * | 7/2001 | Leung et al. ............... 370/336 |

FOREIGN PATENT DOCUMENTS

| EP | 0599632 A2 | 11/1993 |
| EP | 0663737 A2 | 12/1994 |

OTHER PUBLICATIONS

James F. Whitehead, "Distributed Packet Dynamic Resource Allocation (DRA) for Wireless Networks", (Abstract).
S. Choi, et al: "transmitter power Control (TPC) and Dynamic Frequency Selection (DFS) Joint Proposal for 802.11h WLAN", IEEE P802.11 Wireless LANS, Transmitter Power Control (TPC) and Dynamic Frequency Slection (DFS) Joint Proposal for 802.11h (IEEE 802.11-01/169), Online, Mar. 12, 2001, pp., 1-16, XP002213584.
T. Adachi et al; "A Stdy on Channel Usage in a Cellular Ad-Hoc United Communciation System for Operational Robots", IEICE Transactions on Communications, Institute of Electronics Information and Comm. Eng. Tokyo, JP, vol. E81-B, No. 7, Jul. 1, 1998, pp. 1500-1506, XP000790184.

* cited by examiner

Primary Examiner—Huy D. Vu
Assistant Examiner—Jason Mattis (57) ABSTRACT

A system and method for providing concurrent transmission in a wireless Local Area Network (WLAN) are provided. The WLAN includes a plurality of stations for transmitting information via an assigned TDM time slot, and an access point in communication with the stations for monitoring access control and providing time allocation to allow data exchange between multiples pairs of stations, without the intervention of the access point. For establishing concurrent transmission, the access point periodically broadcasts a signal message to the stations over a wireless communication channel to determine pairs of stations that are hidden from each other based on the interference power level reported by each station.

21 Claims, 7 Drawing Sheets

FIG. 1
(PRIOR-ART)

| RECEIVED SIGNAL STRENGTH($t_i$) (RSS) | STA 1 | STA 2 | STA 3 | STA 4 | ... | STA N |
| --- | --- | --- | --- | --- | --- | --- |
| $t_1$ | $RSS_1 < RSS_{th}$ | $RSS_2 < RSS_{th}$ | $RSS_{STA_3} < RSS_{th}$ | $RSS_{STA_4} < RSS_{th}$ | | ⋮ |
| $t_2$ | $RSS_{STA_1} < RSS_{th}$ | $RSS_{STA_2} < RSS_{th}$ | $RSS_{STA_3} < RSS_{th}$ | $RSS_{STA_4} < RSS_{th}$ | | ⋮ |
| $t_3$ ... | ... | ... | ... | ... | | ⋮ |

INCREASING LINK CAPACITY VIA CONCURRENT TRANSMISSIONS IN CENTRALIZED WIRELESS LANS

BACKGROUND OF THE INVENTION

1. Field of invention

The present invention relates to a wireless local area network (WLAN). More particularly, the present invention relates to a method for increasing link capacity in the wireless local area network (WLAN).

2. Description of the Invention

The wireless local area network (WLAN) is a fast-growing market designed to provide the flexibility of wireless access into the office, home, production, or public environment. This unprecedented growth is fueled by the popularity of portable end-user devices and advances in wireless data communications.

Figure 1:
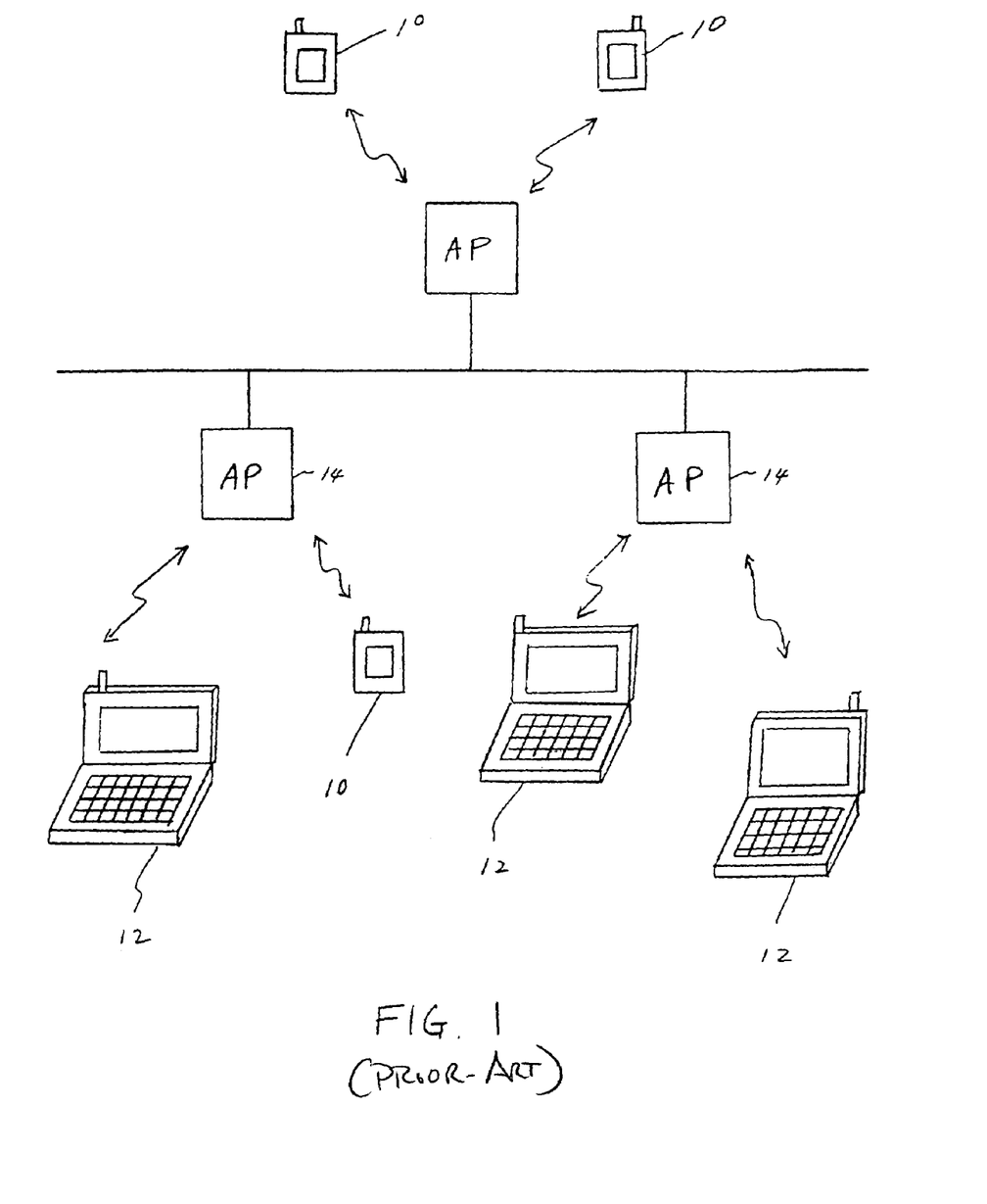
FIG. 1 illustrates a typical infrastructure network for providing access to other networks.
Figure 2A:
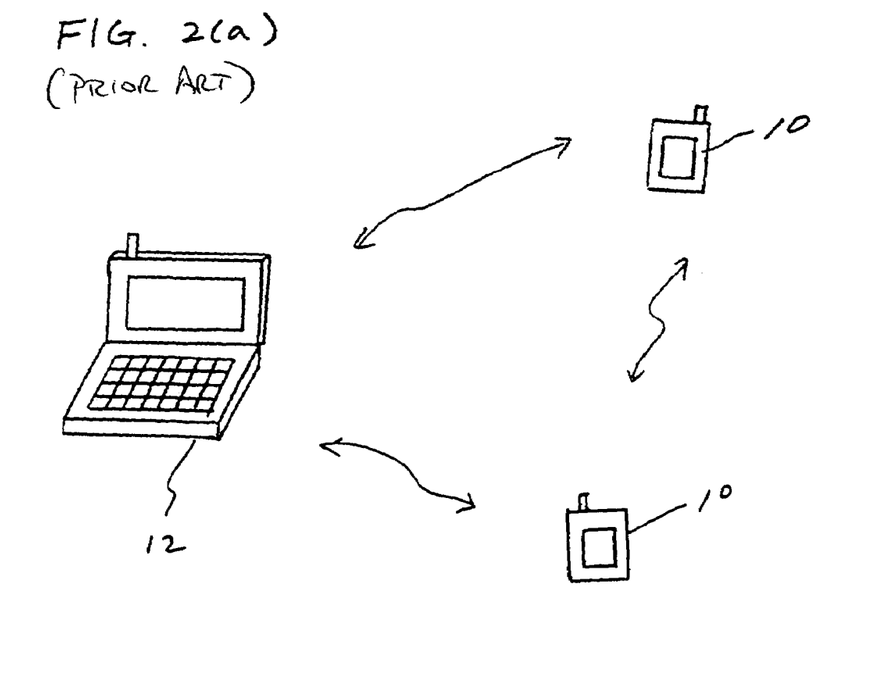
FIG. 2(a) and FIG. 2(b) illustrate two ad hoc wireless networks.
Figure 2B:
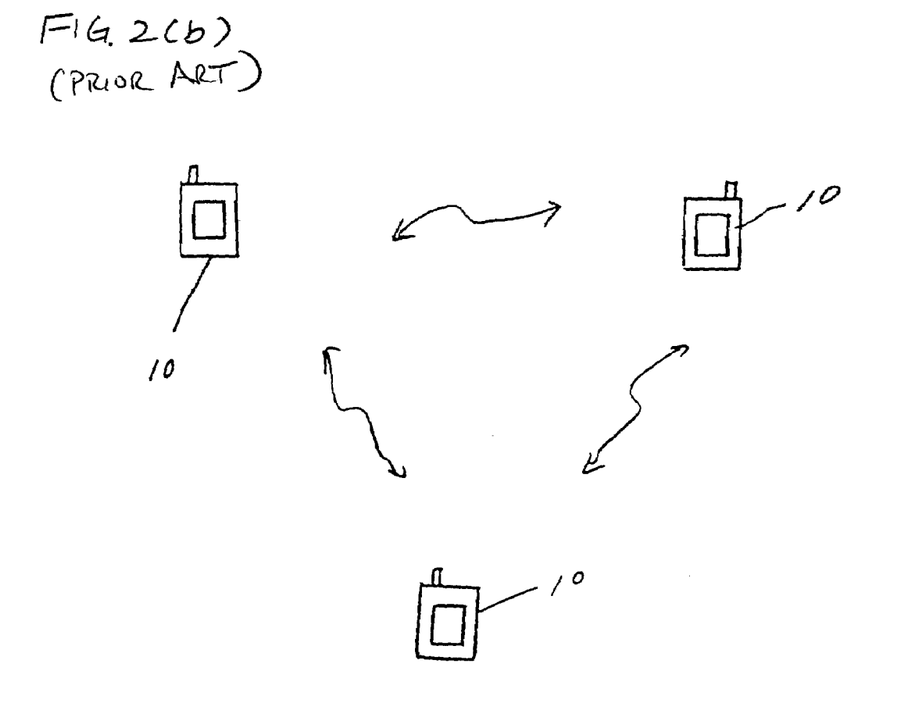

Basically, there are two variants of WLAN, infrastructure-based and ad hoc. FIG. 1 illustrates a typical infrastructure network that is capable of providing access to other networks. In this infrastructure-based wireless network, communication typically takes place only between the wireless nodes and the access point (AP), not directly between the wireless nodes. FIG. 2(a) and FIG. 2(b) illustrate ad hoc wireless networks with different end-user devices. In the ad hoc network, each node can communicate with another node if they are within each other's radio range or if other nodes can forward the message.

In an infrastructure network, the wireless nodes, called stations (STA), can exchange data via the AP. The stations and the AP, which are within the same radio coverage, are known as a basic service set (BSS). The main functions of the AP is to support roaming (i.e., changing access points), synchronize within a BSS, support power management, and control the medium access to support time-bounded service within a BSS. Several BSSs (or APs) are interconnected via a system, called the distribution system, to form a single network to extend the wireless coverage area.

In contrast to the wireline technologies, the WLAN is typically restricted in its diameter to buildings, a campus, a single room, etc., and has much lower bandwidth due to limitations in radio transmission (e.g., typically 1–11 Mbit/s). Thus, it is highly desirable to utilize the wireless link bandwidth efficiently in the WLAN.

SUMMARY OF THE INVENTION

The present invention provides an apparatus and method capable of providing concurrent transmissions between multiple pairs of portable end-user stations to transmit data within a WLAN, so that the network capacity can be increased in a partially connected WLAN, in which there exist hidden terminals.

Accordingly, a method for providing concurrent communication between a plurality of stations via radio transmissions is provided and includes the steps of: periodically broadcasting a signal message from the access point to the plurality of stations over a wireless communication channel, wherein signal message comprises a plurality of assigned time division multiplex (TDM) time slots; transmitting, by each said station, at least one data indicative of an interference power level from adjacent stations in the respective assigned TDM time slot of the signal; determining optimal pairs of a transmitting station and a receiving station that are hidden from each other based on the received interference power level for the concurrent transmission; and, broadcasting this determination to the plurality of stations.

A radio transmission system capable of providing concurrent transmission in a wireless LAN is provided and includes a plurality of stations having a radio coverage area and being operative to transmit information via an assigned TDM time slot; and, at least one access point in communication with the plurality of stations for broadcasting over a wireless communication channel a request to transmit data indicative of interference power level at which a particular station is able to receive from adjacent stations, wherein data signals between multiples pairs of the stations can be exchanged concurrently without the benefit of the access point.

BRIEF DESCRIPTION OF THE DRAWINGS

The above features and advantages of the present invention will become more apparent from the following detailed description when taken in conjunction with the accompanying drawings, in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments which depart from these specific details. Moreover, for the purpose of clarity, detailed descriptions of well-known devices, circuits, and methods are omitted so as not to obscure the description of the present invention with unnecessary detail.

Figure 3:
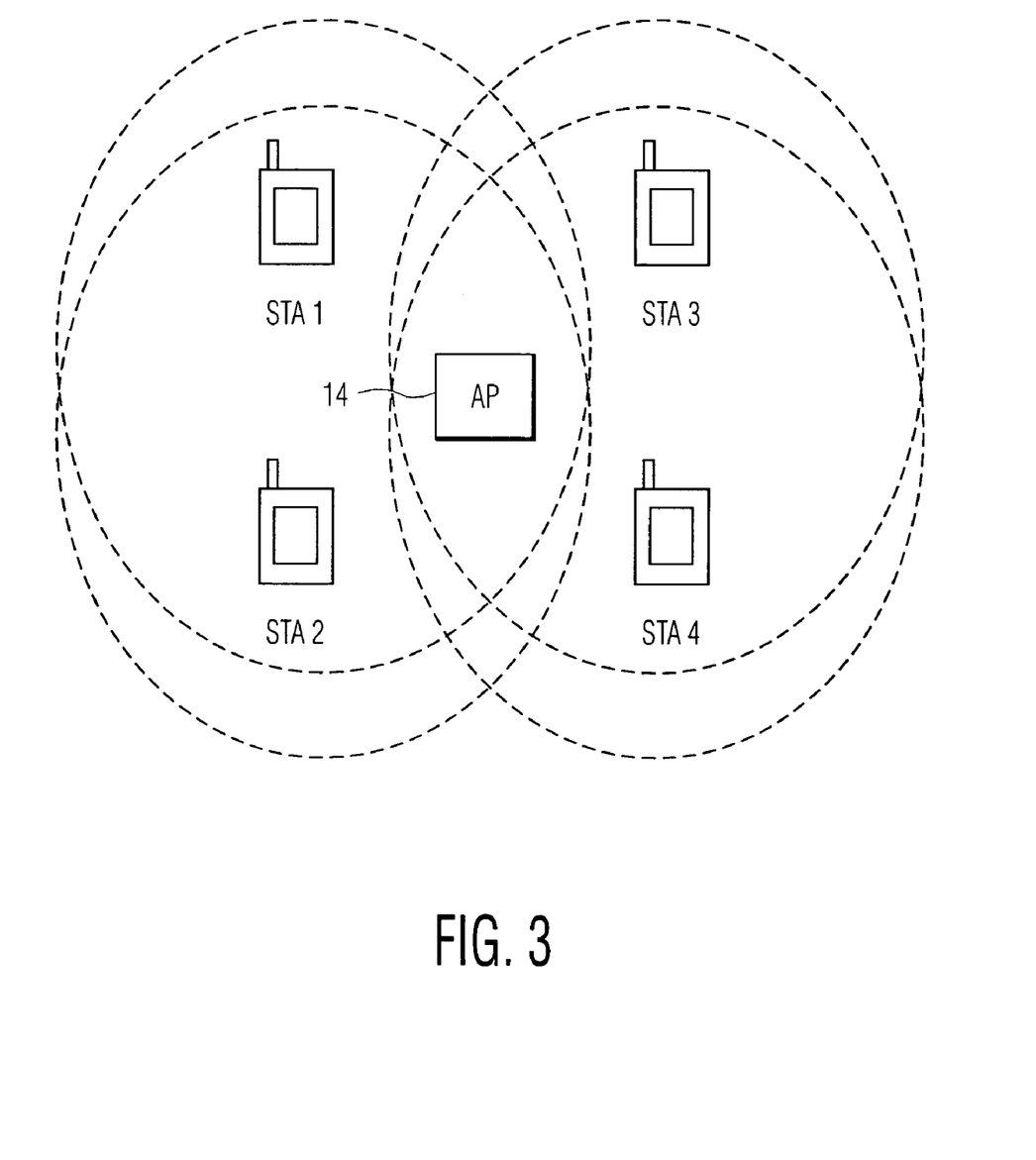
FIG. 3 illustrates a partially connected WLAN according to the present invention.

Referring to FIG. 3, the present invention provides a method for providing concurrent transmission that would increase link capacity within a partially connected WLAN. The WLAN according to the present invention includes several nodes, called stations ($STA_1$) 10 connected to an access point (AP) 14. The invention provides a mechanism to allow two (or possibly more) stations to transmit packets at the same time through peer-to-peer transmission among stations. It should be noted that station 10 includes a lap-top computer, a mobile phone, and other mobile computer devices, such as a personal digital assistant (PDA), a personal communication assistant (PCA), an electronic organizer, an interactive TV/set-top box remote control, or any duplex interactive devices.

Figure 4:
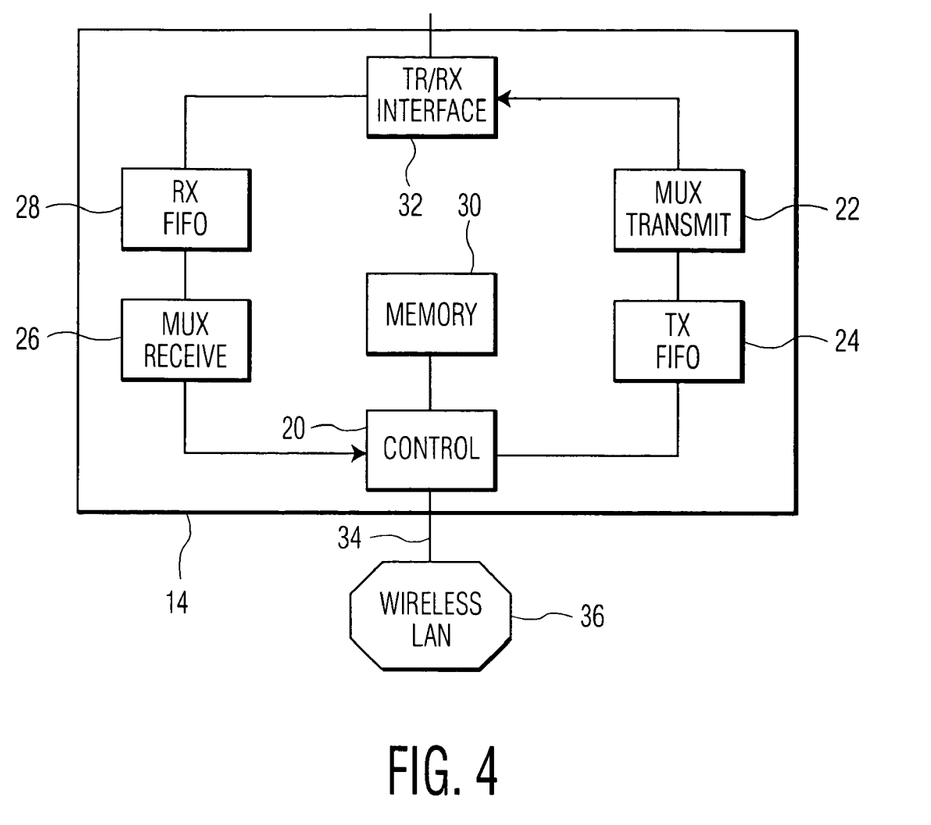
FIG. 4 illustrates a simplified block diagram of an access point (AP) according to an embodiment of the present invention.

Referring to FIG. 4, the AP 14 according to the present invention is a fixed station within the network that communicates with each active STA to support synchronization and control medium access. In the embodiment of the present invention, the AP 14 has the role of monitoring signals emitted by the STAs in order to allow data exchange among STAs in a collision-free environment. Thus, the role of the AP 14 is to provide a common timing basis and allocate communication resources for the STAs that are active in the WLAN. Each station includes an access mechanism to the wireless medium and radio contact to the AP 14. Accordingly, the partially connected WLAN relies on the AP 14 and the infrastructure for basic services, such as the authentication of access and the control of medium for data with associated quality of service. It also allows for direct communication between the wireless STAs.

Major components of the AP 14 that enable active STAs to communicate with each other includes a control processor 20, a transmitter multiplexer 22, a transmitted packet FIFO 24, a receiver multiplexer 26, a received packet FIFO 28, a memory 30, and a transmitter/receiver interface 32. The control unit 20 manages the overall function of the AP 14 and interfaces with the wireless LAN 36 via a bus 34 for all data signals transmitted/received therebetween. The control unit 20 includes an EEPROM (not shown), which stores different programmed instructions, WLAN access instructions, contention resolution instructions, and a communication function instruction for exchanging data. The control unit 20 is coupled to a memory 30 for storing a list of identification of all active STAs. The Rx multiplexer 26, which demodulates signals received from the active STAs, allows data from Rx FIFO 28 to be transferred to the control unit 20. Similarly, the Tx multiplexer 22, which modulates signals to active STAs, allows data from Tx FIFO 24 to be transferred to the active STAs.

Now, the provision of allocated time slot to support concurrent transmission according to the present invention will be explained in detailed description.

Figure 5:
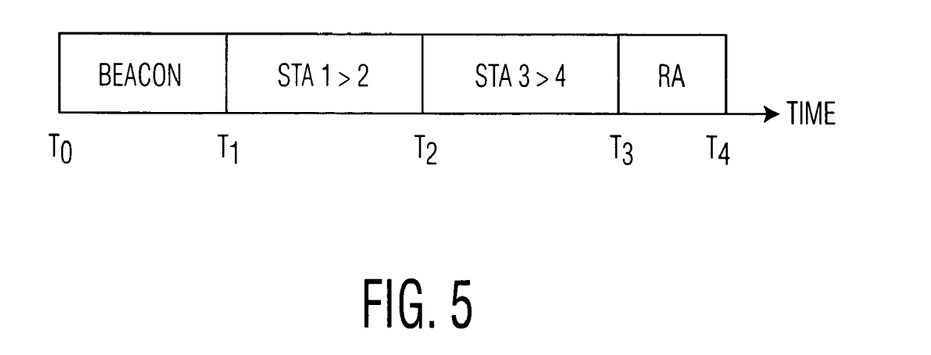
FIG. 5 illustrates a basic structure of a medium access control (MAC) network frame according to an embodiment of the present invention.

Referring to FIG. 3, the transmission range of STA 1 can reach STA 2, but it can not reach STAs 3 and 4. At the same time, the transmission range of STA 3 reaches STA 4, but not STAs 1 and 2. Hence, STAs 1 and 2 are hidden from STAs 3 and 4 and vice versa. The only way STAs 1 and 3 (also 4) can communicate with each other is through the AP 14 The underlying MAC protocol according to the present invention, as shown in FIG. 5, will enable pairs of STAs 1 and 2, and STAs 3 and 4 to exchange data directly to each other simultaneously without the benefit of AP 14, by coordinating the medium access using a TDMA access mode.

According to a preferred embodiment of the present invention, each network frame starts with a beacon transmission from the AP 14 to all the active STAs in the BSS. Referring to FIG. 5, the beacon field indicates the information about the time slot allocation for each STA. It also includes the synchronization information as well as the information about the AP 14 itself, so that new STAs can associate with the AP 14. Based on the time slot allocation information, each station can decide when to transmit its pending traffic, and/or when to receive traffic destined to it. For example, in FIG. 5, the beacon informs that time slot between (T1, T2) is for STA 1's transmission to STA 2, (T2, T3) for STA 3's transmission to STA 4, and (T4, T5) for random access (RA). Accordingly, each STA starts transmitting its pending traffic at the beginning of the allocated time slots and completes the transmissions by the end of the allocated time slots. The size of the network frame can differ depending on the supported applications. For example, if there are interactive voice applications supported in the network, the network frame size, or the beacon transmission interval, will be typically 20 msec or less. However, if there are only broadcast video applications supported, the network frame size can be as long as 100 msec. As such, the network frame size can be adapted as time goes depending on the network situation.

In the embodiment of the present invention, the isochronous traffic, which requires bounded delay and guaranteed throughput, is transmitted in a connection-oriented manner during the allocated time slots while the connection-less asynchronous traffic is transmitted during the RA period based on a random access-based MAC. During the random access (RA) period, the STAs can also request new bandwidth reservations (or time slot allocations) for new connections. For each successful request, the AP will perform an admission control to check whether if it is possible to support the requested connection without compromising the performance of the existing connections. If such a connection is feasible, the AP will reserve the necessary bandwidth and will allocate time slots for the connection beginning the next network frame. However, the transmissions in the RA period can result in collisions due to the nature of the contention-based access. To prevent such a collision during the RA period, a carrier sense multiple access with a collision avoidance (CSMA/CA) scheme, as set forth under the IEEE 802.11 Wireless LAN standard, may be used. It should be noted that other MAC protocol apparent to those skilled in this art can be implemented.

Basically, the CSMA/CA protocol requires a station that shares a common facility with one or more other stations to detect a carrier before initiating transmission. Here, the carrier detection process operates to temporarily inhibit transmission by a sending station when another station or hidden station is sensed to be in transmission. If the medium is sensed as being idle for a predetermined duration, a station can access the medium at once. If the medium is busy, the sending stations must wait for the duration of a random back-off time with a contention window.

In the existence of the hidden terminals, CSMA/CA may not work very well. As being used in 802.11, Request to Send (RTS)/Clear to Send (CTS) mechanism can be used in conjunction with CSMA/CA to handle the hidden terminals. That is, when a STA determines to transmit a packet after a back-off, it first sends a RTS packet with the transmission time information first. The destination STA will respond with a CTS packet with the transmission time information. After a successful reception of the CTS, the source STA will transmit the packet. All the STAs, which receives either RTS or CTS, will keep silent during the informed transmission time of the packet. As the CSMA/CA as well as RTS/CTS are well known in the art, a further detailed description will be omitted.

Figure 6:
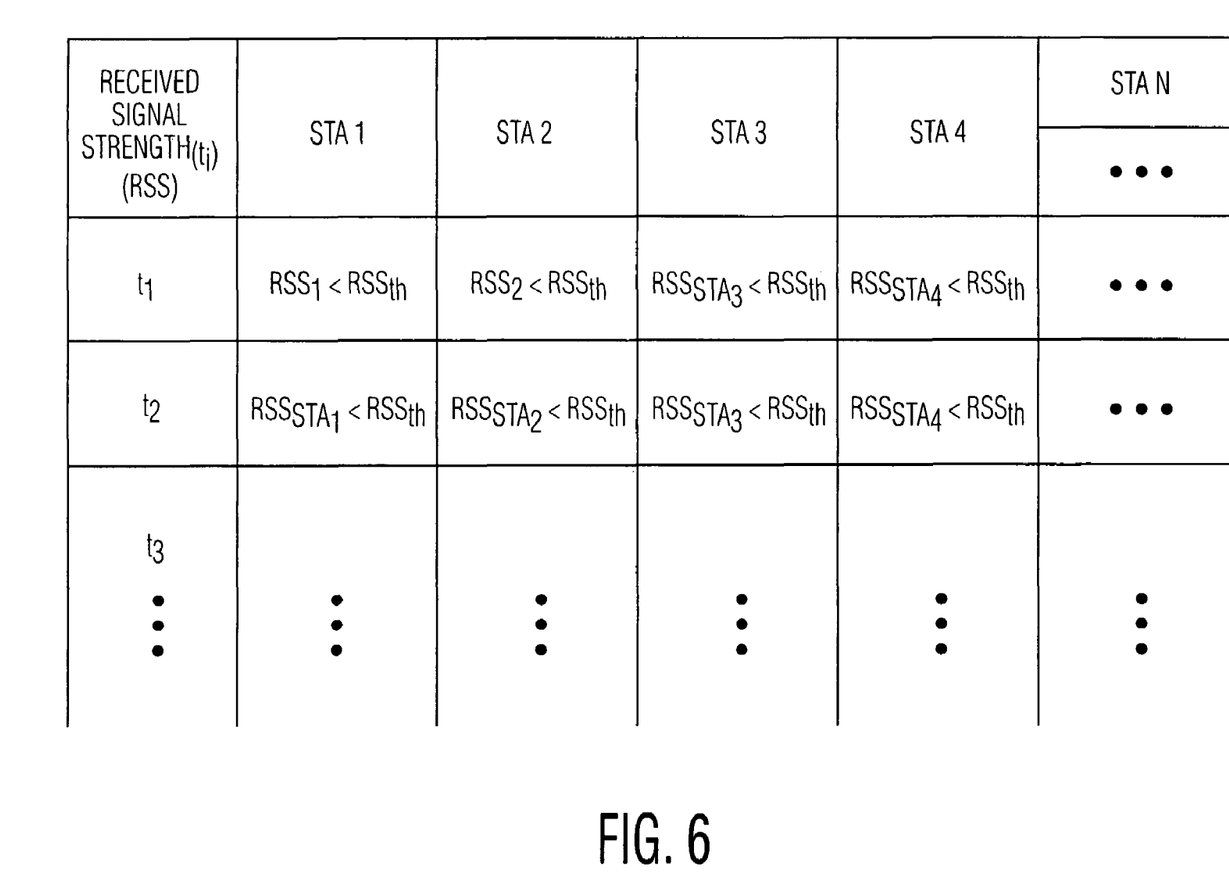
FIG. 6 illustrates a table stored in the access point according to the present invention.
Figure 8:
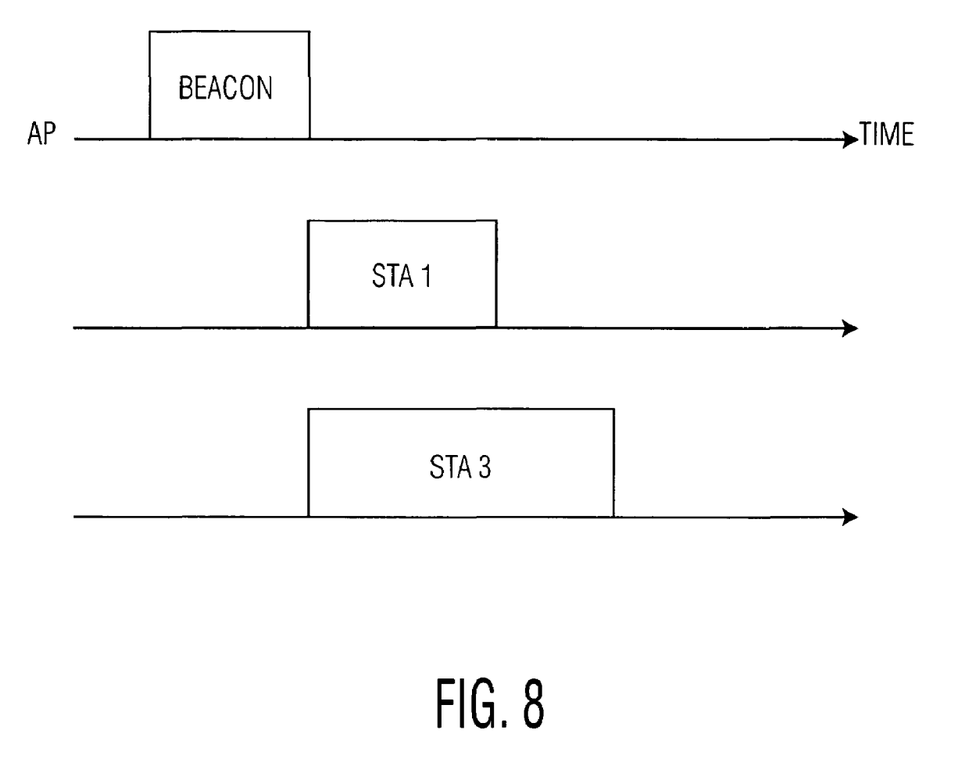

In the embodiment of the present invention, active communication may take place simultaneously between the pairs of stations (STA1 and STA2) and (STA3 and STA 4) over a single (frequency) wireless channel as shown in FIG. 8. Although a limited number of STAs is shown in FIG. 3 for illustrative purposes, it is to be understood that the WLAN can support concurrent communications between a much larger number of STAs. Thus, the number of STAs in the drawing should not impose limitations on the scope of the invention. In the preferred embodiment, the AP updates the current interference level association of each active STA with other STAs. This is achieved by (1) the AP announcing the slot allocation via the periodic beacon transmissions; and (2) each STA reporting the reception status from each transmitter during the last network frame. The reception status is represented in terms of received signal strength (RSS). The table of FIG. 6 holds a list of active STAs and a list of signal strength levels for each active STA in relation to other STAs.

Figure 7:
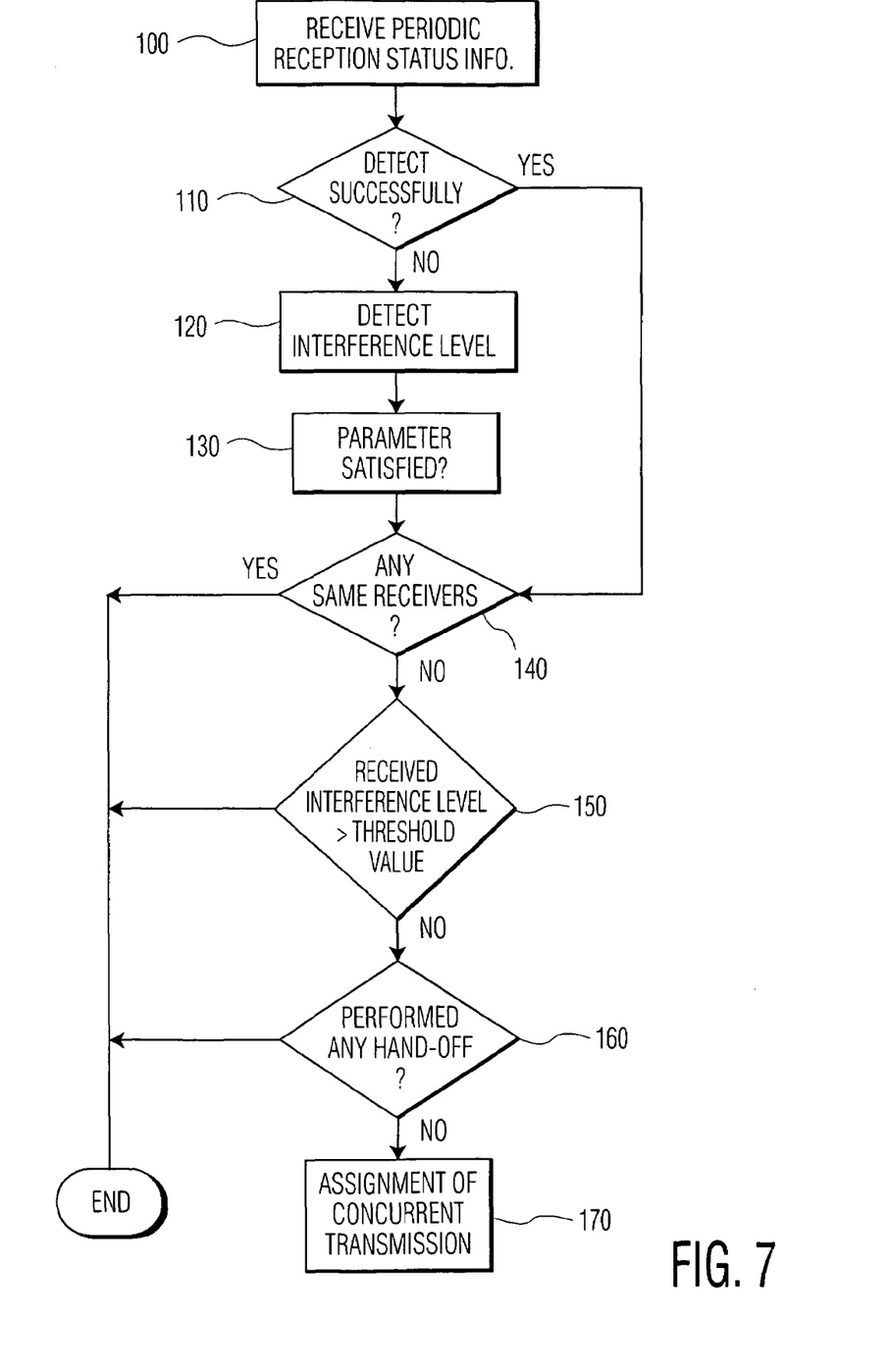
FIG. 7 illustrates a flow chart illustrating the process of allocating resources to provide a peer-to-peer transmission; and, FIG. 8 shows a graphic illustration of concurrent transmission under the MAC data protocol according to the present invention.

With reference to FIG. 7, the active STAs receive and process the beacon frame transmittal from the AP 14 to determine which STA transmits when during the upcoming network frame. Then, each active node transmits a return signal, which indicates the determined received signal strength level of each STA to the AP 14. Preferably, each active node transmits the return signal to the AP during its assigned allocation time slot or during the random access period, if not assigned. Thereafter, the AP 14 updates the table to reflect the received signal strength level for each active STA then newly allocates time allocation for all STAs. Based on the updated information, the AP 14 can determine which stations are hidden from each other. If the received signal quality degrades below a set limit, or if certain conditions are met (described in further detail later), a subsequent frame message from the AP 14 to the active STAs is transmitted to designate time allocation for multiple peer-to-peer transmissions. Upon receiving each beacon frame, each active STA processes the beacon signal to determine the time allocation for concurrent transmission.

The illustrative programmed instructions for WLAN access and frame acquisition are shown in FIG. 7, and described below.

FIG. 7 is a flow chart describing how multiple pairs of stations can access the shared medium of WLAN depicted in FIG. 3 for concurrent transmission. The method for supporting concurrent transmission between multiple pairs of STAs through the shared medium of the WLAN is initiated in step 100. In step 100, the AP 14 will collect the reception status information from all STAs in the network periodically. The reception status information of an STA is defined by the received strength of signal transmission from other STAs that is reported during the reserved time slots. For example, when the STA2 is a receiving station knowing the maximum allowed interference for the expected packet from other stations, it can determine whether the packet can be received based on the signal level received from other stations. The receiving station STA2 knows what Signal-to-Interference Ratio (SIR) that are required for a successful reception of the packet. Accordingly, upon receiving the beacon frame from the AP 14, the receiving station determines the required signal level so that the SIR required for successful transmission is met. Also, each station knows which slots are allocated to which STAs as this information is broadcast via the beacon at the beginning of network frames.

In step 110, based on the received-signal-strength indication (RSSI) and the minimum transmit power level in the transmitted packet, each station can predict whether a packet can be received successfully. In this manner, the received signal strength (RSS) indicates the signal level if an intended signal (or packet) is received successfully, otherwise indicates the interference level. For example, STA 2 will report that it received the packet successfully from STA 1 within the time period of T1 to T2, while it could not hear the transmission of STA 3's transmission from time T2 to T3. As shown in FIG. 5, STAs with allocated time slots of STAs 1 and 3 can report the reception status during the allocated time slots, while others stations, STAs 2 and 4, have to report the reception status during the RA period. Also, the reception status information can be piggy backed into the normal data traffic irrespective of the destination of the data traffic as the AP is capable of receiving any data frame.

In step 120, if a STA cannot receive another STA's transmission successfully, each station also indicates the current interference level using, for example, some combination of RSSI levels received just before and/or just after the frame. Also, the reception status information containing interference-related information can be piggy backed into the normal data traffic irrespective of the destination of the data traffic as the AP is capable of receiving any data frame. After performing steps 110–120, the AP 14 will have an overall picture of the wireless link connectivity within its coverage. It should be noted that this connectivity map can vary over time due to the nature of the time-varying wireless links. By knowing the network connectivity, in step 120, the AP 14 can now allocate a specific set of time slots to transmit two (or possibly more) STAs at the same time. For example, in the case of FIG. 3, after learning that the hidden terminals (STAs 2 and 3) cannot hear each other based on the reception status information, STAs 1 and 3 can be arranged to transmit at the same time.

However, in step 130, prior to the assignment of concurrent transmission, it is determined whether permissible parameters are met. First, in step 140, it is determined whether the candidates of the receiving stations determined in step 120 for concurrent transmission are the same. If they are the same, the concurrent transmission is not allowed.

Thereafter, it is determined in step 150 whether the interference level reported by the stations exceeds a predetermined threshold interference level. If not, the concurrent transmission is not allowed. If the condition is satisfied, it is determined in step 160 whether any one of the transmitting or receiving stations is exhibiting patterns of movements. Typically, mobility patterns of STAs can be detected by monitoring any time-varying reception status information. If varying mobility pattern is detected, such a station is not allowed concurrent transmission. Here, moving STAs is considered, especially as a transmitter, as their transmission and reception ranges vary over time. Moreover, in step 160, if any STA determined in step 120 has performed a hand-off (in case of a cellular structured WLAN with multiple APs), such a data will not be allowed to transmit via concurrent transmission since it may move again in the future.

Finally, in step 160, if all permissible parameters of steps 140–160 are satisfied, the AP 14 will allocate time slots and the required bandwidth for concurrent transmission.

In summary, the present invention provides the concurrent transmission of pairs of stations located within a partially connected WLAN based on the set parameters in order to increase the link capacity in the same network. The concurrent transmission mechanism proposed here can be implemented in any TDMA-based wireless system with peer-to-peer transmissions among STAs.

In addition, the present invention can be further enhanced by adjusting two factors that can further improve the performance of the concurrent transmissions. Firstly, it is well known that a power control scheme can allow packets to be transmitted at the minimum power level that is needed to attain the required bit error rate depending on the distance to the destination STA. The transmission range (or the circle in FIG. 3(a)) will vary depending on the transmit power level of the transmitting STA. As. Accordingly, if the power level is adjusted so that more hidden stations can result in the network, the present invention would be more adapted to support a higher percentage of concurrent transmission, thereby increasing the link capacity within the same network.

Secondly, when the AP 14 allows concurrent transmissions, it may be desirable to instruct the transmitters to transmit at lower (so more robust) rates depending on the interference levels reported by the receivers. In this case, the AP must determine whether the concurrent transmissions with lower transmission rates are better than higher transmission rates in terms of the total system throughput.

Therefore, before initiating the concurrent transmissions for two (or more) different receivers, the AP may implement a short test period to determine if it is really feasible to enable the concurrent transmissions in light of the above factors. That is, by instructing the candidate transmitters to transmit short test packets during the test period, then by hearing back from the receivers about the reception status, the AP can figure out the feasibility of the concurrent transmissions.

Having thus described a preferred embodiment of a method for concurrent transmission communications in a WLAN, it should be apparent to those skilled in the art that certain advantages of the system have been achieved. The foregoing is to be constructed as only being an illustrative embodiment of this invention. Persons skilled in the art can easily conceive of alternative arrangements providing functionality similar to this embodiment without any deviation from the fundamental principles or the scope of this invention.

What is claimed is:

1. A method for providing concurrent communication between a plurality of stations via radio transmissions in a time division multiplexing access (TDMA) communications system, the method comprising the steps of: (a) periodically broadcasting a signal message from an access point to said plurality of stations over a wireless communication channel, said signal message including a plurality of assigned time division multiplex (TDM) time slots; (b) transmitting, by each said station, at least one data indicative of an interference power level from adjacent stations in the respective assigned TDM time slot of said signal; (c) determining pairs of transmitting stations that will be transmitting to each other, wherein said pairs are hidden from each other based on the received interference power level for said concurrent transmission; and, (d) broadcasting said determination to said plurality of stations.

2. The method as recited in claim 1, further comprising the step of granting said concurrent transmission of information packets between said pairs of station with the transmission occurring without the intervention of said access point.

3. The method as recited in claim 2, wherein the communication between said access point and said plurality of stations are performed via a time division multiplexing access (TDMA) technologies.

4. The method as recited in claim 1, wherein said optimal pairs are selected if said receiving stations of said optimal pairs are different from each other.

5. The method as recited in claim 1, wherein said optimal pairs are selected if said receiving station has been receiving signals consistently from the same transmitting station.

6. The method as recited in claim 1, wherein said optimal pairs are selected if said receiving stations of said optimal pairs have not performed a handoff from one network to another network.

7. A method for providing concurrent communication between a plurality of stations via radio transmissions, the method comprising the steps of: (a) maintaining a table of active stations, said table including a current data transmission schedule and interference level; (b) periodically broadcasting over a wireless communication channel a signal message from an access point (AP) to said plurality of stations, said message including a request to transmit at least one data indicative of interference power level information from adjacent stations; (c) reporting, by each said station, said interference information to said access point via an assigned time division multiplex (TDM) time slot of said signal message by each said station; (d) determining at least one pair of stations that will be transmitting to each other, wherein said pairs are hidden from each other based on said reported interference information for concurrent transmission; and, (e) granting said concurrent transmission of information packets between said pairs of stations with the transmission occurring without the intervention of said access point.

8. The method as recited in claim 7, wherein said signal message includes data indicative of (i) address of said plurality of stations, (ii) the present power level of each said station for data transmission, (iii) the rate of data transmission for each said station and (iv) related information of said access point.

9. The method as recited in claim 7, further comprising the step of broadcasting said determination to said plurality of stations.

10. The method as recited in claim 7, further comprising the step of transmitting and receiving information packets between said stations without the intervention of said access point.

11. The method as recited in claim 7, wherein the communication between said access point and the plurality of said stations are performed via time division multiplexing access (TDMA) technologies.

12. The method as recited in claim 7, wherein said concurrent transmission is granted if said receiving stations of said pairs are different from each other.

13. The method as recited in claim 7, wherein said concurrent transmission is granted if said receiving station has been receiving signals consistently from the same transmitting station.

14. The method as recited in claim 7, wherein said concurrent transmission is granted if said receiving stations of said pairs have not performed a handoff from one network to another network.

15. A radio transmission system for providing concurrent transmission in a wireless LAN, comprising: a plurality of stations having a radio coverage area and being operative to transmit information via an assigned TDM time slot; and, at least one access point in communication with said plurality of stations for broadcasting over a wireless communication channel a request to transmit data indicative of interference power level at which a particular station is able to receive from adjacent stations, wherein data signals between multiples pairs of said stations, determined to be hidden from each other by said access point, is exchanged concurrently without the benefit of said access point, further comprising a means for selecting said optimal pairs based upon determination that a handoff from one network to another network has not occurred within a predetermined time.

16. The system as recited in claim 15, wherein said access point includes: means for determining concurrent transmission candidates for said stations by comparing the interference level reported via said assigned TDM time slot to a prescribed power level for transmission; means for modulating/demodulating signals received from/to said access point, and for transmitting said received signals at a different time slot from which said signals were received; and, means for interfacing said plurality of stations to a WLAN and for exchanging signals with said stations.

17. The system as recited in claim 15, further comprising means for storing data indicative of a particular time at which said transmission of said data packet is scheduled to start and end.

18. The method as recited in claim 15, wherein said access point provides timing signals for said plurality of stations.

19. The system of claim 15, further comprising means for selecting said optimal pairs based upon each receiving station in said optimal pairs being different from each other.

20. The system of claim 15, further comprising means for selecting said optimal pairs based upon each receiving station in said selected pairs having received signals consistently for a predetermined time from the corresponding transmitting station within said selected pairs.

21. The system of claim 15, further comprising means for selecting said optimal pairs based upon said interference power level of a given station being greater than a threshold value.

* * * * *